United States Patent [19]
Shafer

[11] Patent Number: 6,023,768
[45] Date of Patent: Feb. 8, 2000

[54] PHASE LOCKED DISTRIBUTED TIME REFERENCE FOR DIGITAL PROCESSING AND METHOD THEREFOR

[75] Inventor: Lawrence T. Shafer, St. Peters, Mo.

[73] Assignee: McDonnell Douglas Corporation, St. Louis, Mo.

[21] Appl. No.: 09/017,328

[22] Filed: Feb. 2, 1998

[51] Int. Cl.$^7$ .................................. G06F 1/04; G06F 1/12
[52] U.S. Cl. ........................ 713/400; 713/503; 713/600
[58] Field of Search .................................. 713/400, 401, 713/500, 501, 502, 503, 600; 709/400

[56] References Cited

U.S. PATENT DOCUMENTS

| | | | |
|---|---|---|---|
| 4,860,285 | 8/1989 | Miller et al. ............................. | 370/507 |
| 5,367,641 | 11/1994 | Pressprich et al. ..................... | 395/275 |
| 5,457,718 | 10/1995 | Anderson et al. ...................... | 375/373 |
| 5,504,878 | 4/1996 | Coscarella et al. ..................... | 709/248 |
| 5,920,600 | 7/1999 | Yamaoka et al. ....................... | 375/376 |

*Primary Examiner*—Dennis M. Butler
*Attorney, Agent, or Firm*—Westerlund & Powell; Robert A. Westerlund; Raymond H. J. Powell, Jr.

[57] ABSTRACT

A phase locked distributed time reference system for use in multiplexed communication bus structures. This system is composed of two parts, a master and a slave time reference or clock. The master time reference is a high accuracy clock that is a dedicated distributed clock system which uses an appropriate communication bus, such as the MIL-STD-1553, for distribution but which completely bypasses the other bus protocols and operations. This master time reference would ideally be placed on the processor bus for immediate access. The high order segment, which extend the master time reference to the desired range, i.e. 30 days or longer, is transmitted via the normal bus communications without the need for any special data handling. The only requirement is to update the signal at a cyclic rate faster than the roll over time of the low order segment plus any delay in transmission and assembly of the two halves. The two bits of the low order segment of the slave time reference are frequency multiplexed and are not transmitted via the normal bus communications. The operation of the present invention uses only two of the low order bits to establish a reference. These two bits are reconstructed in the slave time reference by a decoder, a phase locked loop frequency multiplier, and a counter. The two bits are used to compare to a regenerated time from the counter to determine the loss of synchronization and to resynchronize the counter.

20 Claims, 2 Drawing Sheets

PHASE LOCKED DISTRIBUTED TIME REFERENCE FOR DIGITAL PROCESSING AND METHOD THEREFOR

BACKGROUND OF THE INVENTION

The present invention relates generally to time reference devices and methods to synchronize signals and processes in distributed digital processor systems. More particularly, the present invention relates to a unique, highly accurate distributed time reference device and method for serial communications systems that support distributed digital processors.

Presently, there are several different types of multiplexed communication buses in existence which provide a means to distribute digital processors. Each of these bus structures typically has a control interface which includes some method for time synchronization. An example of one such bus structure used in military applications is the military standard MIL-STD-1553 type bus structure. Like most bus structures, MIL-STD-1553 includes interface standards and has a defined bus controller mode of operation. While this bus structure provides a natural distribution network for time synchronization across the system, this bus structure, as well as most other bus structures, lacks a highly accurate time synchronization ability as related to distributed processing. This is primarily due to the location of the time reference relative to the processing unit and the method of alignment of the time reference devices in a distributed processing system.

Other methods used for time synchronization employ a dedicated bus to distribute a synchronizing pulse which starts free running timers periodically. The free running timers drift over time, but are resynchronized (reset) with each synchronizing pulse. Absolute time may be kept by using a master timer to generate the pulses as the value (i.e. binary) changes from all 1's to all 0's. Each processor in the distributed processing system has its own timer. The alignment of the collective time reference system is limited by the time of propagation of the synchronizing pulse and the drift rate between each pulse. Therefore, such systems must use very high frequency counters with highly stable and accurate clocking signals to assure the desired instantaneous alignment accuracies. Accordingly, there exists a need in the art for a device and method which synchronizes distributed processors without the need for an additional transmission system or additional highly accurate clocking signals. The present invention addresses such a need.

Other timing mechanisms used in MIL-STD-1553 interfaces are used for controlling cyclic data transfers. An example of such a timing mechanism is described in U.S. Pat. No. 5,367,641 issued to Pressprich, et. al. on Nov. 22, 1994 and entitled, "MIL-STD-1553 Interface Device Having A Bus Controller Minor Frame Timer." The invention described in this patent includes an integrated circuit (IC) which interfaces a piece of communications equipment to a MIL-STD-1553 bus in accordance with the MIL-STD-1553 interface standards and operates in the MIL-STD-1553 defined bus controller mode of operation. The IC implements a command block configuration of data storage locations in an external memory. The command block includes a plurality of words arranged contiguously, including a first word indicative of one of a plurality of different opcodes that define the operation of the IC. The command block words include a MIL-STD-1553 defined command to be transmitted on the bus by the IC. A plurality of command blocks are arranged contiguously in a minor frame format. In order to sequentially execute a plurality of minor frames at different frequencies, the IC contains an internal timer that controls the execution time of each minor frame. The first command block of each minor frame contains an opcode that loads the timer with a predetermined value for the corresponding frequency of execution of the particular minor frame. The timer counts down and decrements to zero before it is loaded with a value for execution frequency of the next minor frame. While the timer is decrementing, the IC executes the command blocks that follow the first command block. Those skilled in the art will appreciate that while this invention will be useful in several specific applications, it requires a specialized protocol and/or sequencing of the signal. Accordingly, the invention described in U.S. Pat. No. 5,367,641 may not be used for general applications.

SUMMARY OF THE INVENTION

The present invention encompasses a phase locked distributed time reference system for use in multiplexed communications. This system is composed of two different parts, a master timer or time reference system and a slave timer. The master time reference system is a high resolution counter that constitutes a dedicated distributed clock system which uses an appropriate communication bus, such as the MIL-STD-1553, for distribution, but which completely bypasses the bus protocols and data transmissions. This master time reference preferably is placed directly on the processor bus for immediate access. The time value generated from the master time reference is separated into two different signals, a high order segment and a low order segment.

The high order segment, which extends the master clock to the desired range, i.e. 30 days or longer, is transmitted via the normal bus communications without the need for any special data handling. The only requirement is to update the high order segment at a cyclic rate to assure availability as the low order segment rolls over.

The low order segment is not transmitted via the normal bus communications, i.e. as a binary value. The operation of the present invention uses only a selected number (e.g. two) of the bits in the low order segment to establish a reference. These two bits are transmitted as one of four different frequencies depending on their states and these two bits are reconstructed in the slave time reference system. A phased locked loop is used to generate the clocking signal to the binary counter. The equivalent order bits in the binary counter are use to compare to the regenerated time from the master time reference system to determine the loss of synchronization and to resynchronize the counter. When the most significant bit (MSB) of a counter changes state, all lesser bits also change. This is necessary to test the transition of the only one lesser bit with the MSB to determine synchronization. The bits chosen optimally have frequencies on both sides of the normal communications bandwidth. The bandwidth of the system is chosen to span the update rate of the high half of the time signal.

In another embodiment, the present invention is operated in a bi-directional fashion. For this additional embodiment, two additional communications links must be established, one for the second slave time reference system and a second for an error signal. The forward path provides the basic time reference plus a propagation delay. The return path provides a second time reference that is compared to the master time reference. An error signal is used to increase or decrease the clocking signal to the second reference until it is running in back step, but one propagation delay faster in time than the master reference. Adding the two times at the slave location and dividing by two results in a time reference highly aligned with the master reference and is independent of the propagation delay. Therefore, the propagation delay at the slave can be extracted and corrected.

As those skilled in the art will readily appreciated, the present invention requires no additional transmission system or additional highly accurate clocking signal. All time references according to the present invention are directly and continuously slaved to the master over already available communications systems. Additionally, when implemented in a forward or reverse manner to form a closed loop system, a pair of devices can be aligned as though the propagation delay is zero. This gives the ability to achieve precise time correlation with a vast separation between the devices and even when the distance separating the devices is constantly changing. Moreover, the propagation delay can be extracted and sent to provide precise separation distance between a pair of devices.

BRIEF DESCRIPTION OF THE DRAWING

These and various other features and advantages of the present invention will be readily understood with reference to the following detailed description read in conjunction with the attached drawing, in which.

DETAILED DESCRIPTION OF THE INVENTION

Generally, the present invention provides a highly accurate distributed clock for processors which are distributed in a serial communications network and which require highly accurate time correlation. The distribution network according to the present invention can be any serial communications system linking the processors. The distributed clock, as will be explained herein, uniquely overlays the digital communications and only relies, in part, on the communication buses.

More specifically, the present invention provides a unique device and method for a phase locked distributed time reference system consisting of a master timer or time reference system with multiple slave timers, or in a special fashion, with a single slave. The present invention is most useful in multiplexed communication bus structures where propagation delays are fixed and accountable, and in a phase locked pair where the propagation delay is variable and unknown, such as in an RF link.

Figure 1:
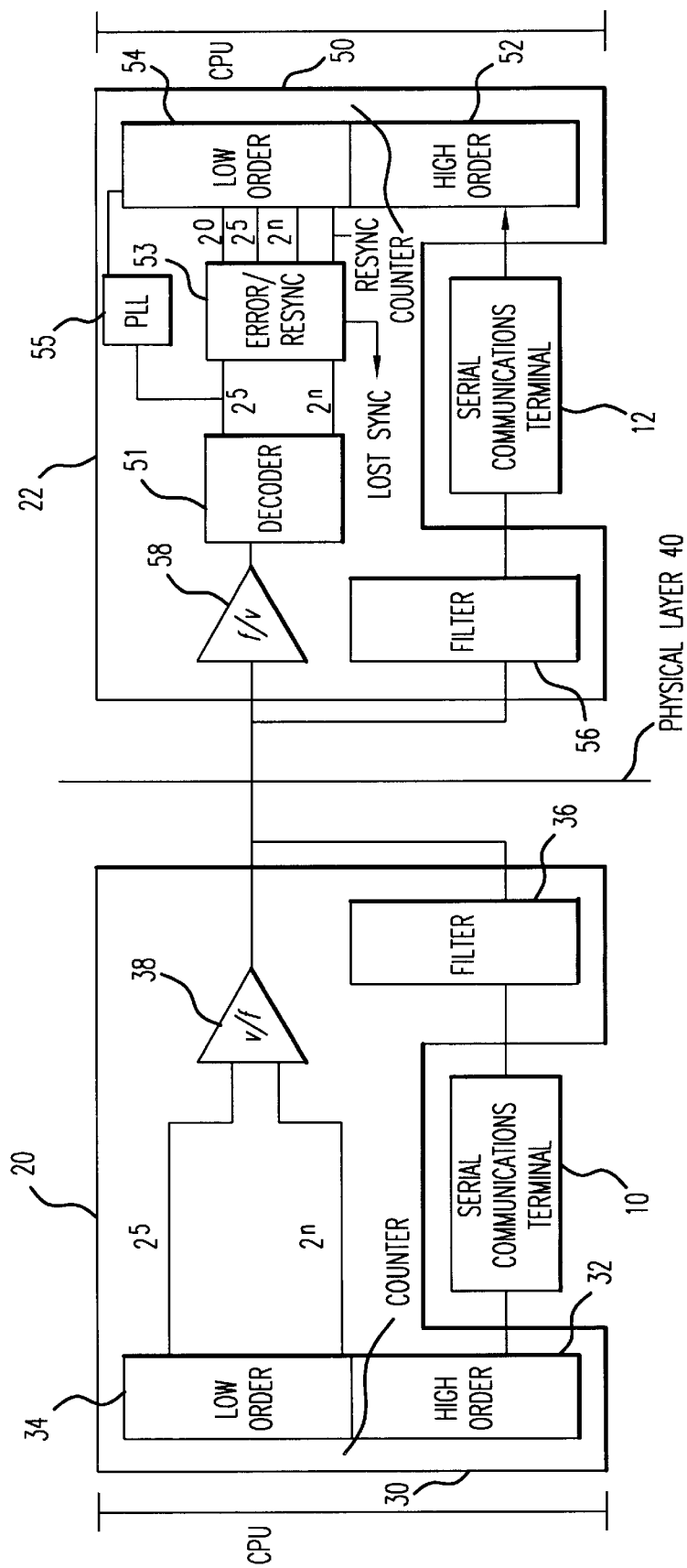
FIG. 1 is a block diagram of the device and method according to one embodiment of the present invention.

Referring now to FIG. 1, the present invention has at least two essential systems, a master time reference or clock system 20 and a slave time reference or clock system 22, which reside over a serial communications network, as represented by serial communication terminals 10 and 12, respectively. The master time reference system is a high accuracy clock that uses an appropriate communication bus, such as the MIL-STD-1553, for distribution, but which completely bypasses the MIL-STD-1553 and other back plane protocols and operations, including the normal binary data communications. This master clock is preferably placed on the processor bus for immediate access.

The master time reference system includes a counter 30 and a high order and low order time reference generator, 32 and 34, respectively. The high order bits, which extend the master clock to the desired range, i.e. 30 days or longer, are transmitted via the normal bus communications without the need for any special data handling. As shown, the high order bits are transmitted through the serial communications terminal 10 and through optional filter 36 before being transmitted to the slave clock system through the physical layer 40. The high order bits preferably are asynchronously transmitted via the serial communications network with appropriate filtering by both optional filters 36 and 56, in order to separate the clock/communications bands. The only requirement for the high order segment 32 is that it needs to be updated at a cyclic rate to account for the delays realized when putting the two halves of the clock, i.e. the high order segment and the low order segment, together.

As illustrated in FIG. 1, the low order segment is regenerated in the slave clock system using the frequency multiplexed bits transmitted via the same serial communication line as the high order segment. As shown, the present invention preferably uses only two low order bits, nominally $2^5$ and $2^n$ (MSB of the low order segment), to establish a reference, although this is not limiting to the present invention, as any selected number of bits may be used. Prior to being transmitted to the slave clock system 22, the two low order bits $2^5$ and $2^n$ are converted to one of four levels and transmitted via voltage to frequency converter 38. The two low order bits are then reconstructed via frequency to voltage converter 58 to one of four levels and then further decoded into two signals. The high frequency bit synchronizes the phase locked loop frequency multiplier 55 which drives the counter 50. The error/resync circuit 53 compares a regenerated time, $2^5$ and $2^n$, from the decoder 51, to the corresponding bits of the counter 50 to determine the loss of synchronization and to resynchronize the counter. The input $2^0$ is used as a delay to present false triggering. Preferably, the bits chosen should have frequencies on both sides of the normal communications bandwidth to maximize timer resolution while minimizing bandwidth requirements. Accordingly, a ×32 frequency multiplier is preferred in the slave clock system. The bandwidth of the clock system should be chosen to span the update rate of the high half of the time signal.

The low half of the time reference system is directly and continuously slaved to the master time reference. The slaving operation uses only two bits which are transmitted using frequency modulation techniques. The two bits that comprise the low half of the time reference are reconstructed in the slave system which will track the master with a fixed propagation delay. The phase locked loop frequency multiplier is used to reconstruct the clocking signal to the slave counter which in the example described above will be 32 times the low order bit received from the master. The two bits of the reconstructed reference time from the master are compared to the output of the slave time reference counter and are used to indicate the loss of sync and subsequent re-synchronization of the slave counter. Preferably, the most significant bit (MSB) from the master time reference clock is chosen to be a greater value than the bus communications update rate.

With the present invention, the distributed clocks, i.e. the master and any slaves, can be locked in synchronization with an accuracy only limited by the propagation delay of the control information, which is accountable in subsequent processing. Therefore, the present invention provides the capability of very high time correlation among processors independent of any other linking communication structures or special protocols, as required in U.S. Pat. No. 5,367,641.

This invention serves as an expedient to any other method or device as it reduces the necessary signaling to phase locked distributed clocks while providing automatic resynchronization or near immediate synchronization detection so that the appropriate measures can be taken until resynchronization occurs.

Figure 2:
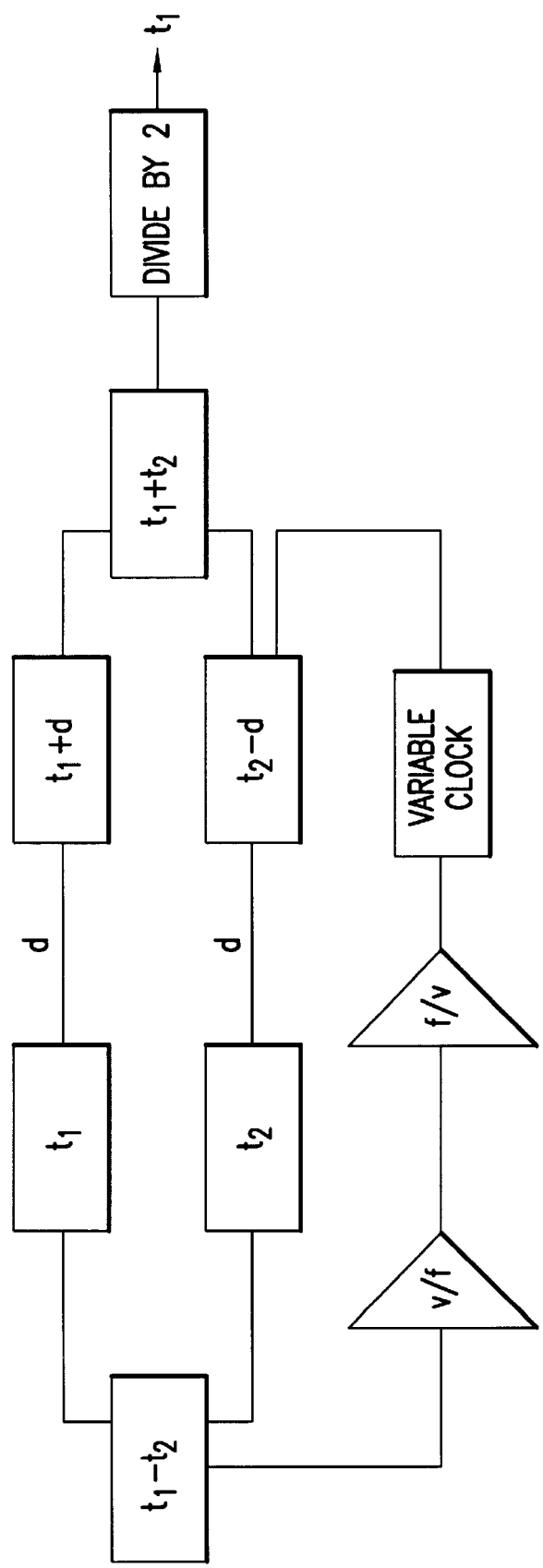
FIG. 2 is a block diagram illustrating the signal processing according to another embodiment of the present invention that nullifies propagation delays.

Additionally, the basic slave time reference system according to the present invention can be implemented in a bidirectional fashion and linked to form a phase locked time reference system that nullifies propagation delay. This embodiment is shown in FIG. 2. Two additional communications links must be established, one for the second slave time reference system, and a second for the error signal. The forward loop will provide the basic reference plus a propagation delay. The return reference then will slave to the master time reference with the error signal being generated in the master time reference system. The resulting time associated with the return loop is the master reference minus the propagation delay when the loop is tracking. Adding the two times at the slave location and dividing by two results in a time highly aligned with the master reference. The alignment accuracies are only limited by the hardware/technology used to implement the present invention. This is shown in FIG. 2, wherein $t_1$ from the master time reference is subtracted from a time $t_2$ in order to obtain the error signal which adjusts the clocking signal to the return reference. When the error signal is stabilized at null, the return reference is advanced from the master reference by the propagation delay. The return reference is then added to the forward slave time to give a 2× value. It is then divided by the slave reference to obtain a fully aligned time reference $t_1$. The voltage to frequency and frequency to voltage converters are used as described above to the make the necessary conversions Although two embodiments of the present invention have been described in detail hereinabove, it should be clearly understood that many variations and/or modifications of the basic inventive concepts herein taught which may appear to those skilled in the pertinent art will still fall within the spirit and scope of the present invention as defined in the appended claims.

What is claimed is:

1. A time reference system for distributed processors in a serial communications network, comprising:
    at least two processors distributed in a serial communications network;
    a master time reference system which separates a clock signal into a high order segment and a low order segment, the master time reference system being coupled to one of the at least two processors in order to couple a communication signal with the clock signal; and
    a slave clock system which includes a phase locked frequency multiplier which reconstructs a reference signal constituted by selected bits of the low order segment.

2. The time reference system of claim 1 wherein:
    the master time reference system includes a voltage to frequency converter which converts the selected bits in the low order segment; and,
    the slave time reference system further includes a frequency to voltage converter for reconstructing the selected bits in the low order segment.

3. The time reference system of claim 1 wherein the high order segment is transmitted from the master time reference system to the slave clock system via the serial communications network.

4. The time reference system of claim 1 wherein:
    the master time reference system further includes a first filter;
    the slave clock system further includes a second filter; and,
    the first and second filters filter the low order segment from the communications signal.

5. The time reference system of claim 1 wherein the low order segment is comprised of two bits, $2^5$ and $2^n$, where n is an integer.

6. The time reference system of claim 5 wherein:
    the master time reference system includes a voltage to frequency converter which converts the selected bits in the low order segment; and,
    the slave clock system further includes a frequency to voltage converter for reconstructing the selected bits in the low order segment.

7. The time reference system of claim 1 wherein the phase locked frequency multiplier is an ×32 frequency multiplier.

8. The time reference system of claim 1 wherein the slave clock system further includes a decoder and an error/resynchronization portion which detect lost synchronization and determine required resynchronization of the low order segment.

9. The time reference system of claim 1, further comprising a binary converter, wherein the segmented bits in the slave clock system are used, in conjunction with corresponding bits from the binary converter to determine loss of synchronization and resynchronize the binary converter.

10. The time reference system of claim 1 further comprising:
    a first communications line which is used as a second slave time reference;
    a second communications link which is used to transmit an error signal;
    a forward loop which provides a basic reference signal plus a propagation delay;
    a return loop which provides a return reference signal which serves as a second time reference; and,
    wherein a resulting time associated with the return reference signal is a master reference signal minus the propagation delay.

11. The time reference system of claim 10 wherein the return reference signal and the master reference signal are added and divided by two.

12. A time correlation method for synchronizing distributed processors in a serial communications network, comprising the steps of:
    distributing at least two processors in a serial communications network;
    coupling a master time reference system to one of the at least two processors in order to couple a communication signal with a clock signal, wherein a clock signal is separated into a high order segment and a low order segment;
    providing a slave time reference system wherein the low order segment provides a reference signal which is reconstructed by a phase locked loop frequency multiplier.

13. The time correlation method of claim 12 wherein the low order segment from the master time reference system is converted by a voltage to frequency converter and is reconverted in the slave time reference system by a frequency to voltage converter.

14. The time correlation method of claim 12 wherein the high order segment is transmitted from the master time reference system to the slave time reference system via the serial communications network.

15. The time correlation method of claim 12 wherein the high order segment is filtered from the communications signal via a first filter in the master time reference system and a second filter in the slave time reference system.

16. The time correlation method of claim 12 wherein the low order segment is comprised of two bits, $2^5$ and $2^n$.

17. The time correlation method of claim 16 wherein the low order segment from the master time reference system is converted by a voltage to frequency converter and is reconverted in the slave time reference system by a frequency to voltage converter.

18. The time correlation method of claim 12 wherein the phase locked loop frequency multiplier is an ×32 frequency multiplier.

19. The time correlation method of claim 12 wherein the slave time reference system further comprises the steps of decoding two bits from the master time reference system and identifying any lost synchronization and resynchronizing the low order segment automatically.

20. The time correlation method of claim 12 wherein corresponding bits from the master time reference system and slave time reference system are output to a detector to determine loss of synchronization, which is, in turn, used to resynchronize a counter in the slave time reference system.

* * * * *